United States Patent [19]

Hwang

[11] Patent Number: 5,005,367
[45] Date of Patent: Apr. 9, 1991

[54] AUTOMATIC COOLANT SPRAYER FOR THE CAR INTERIOR

[76] Inventor: Feng-Lin Hwang, No. 21, Pa Te Rd., Chi Tu District, Keelung City, Taiwan

[21] Appl. No.: 527,403

[22] Filed: May 23, 1990

[51] Int. Cl.$^5$ .............................................. B60H 1/32
[52] U.S. Cl. ........................................ 62/133; 62/121; 62/239; 62/244; 62/304
[58] Field of Search ................. 62/239, 244, 121, 304, 62/133

[56] References Cited

U.S. PATENT DOCUMENTS

| | | | |
|---|---|---|---|
| 2,199,485 | 5/1940 | De Vout | 62/121 X |
| 2,352,748 | 7/1944 | Whiteley | 62/304 X |
| 4,813,238 | 3/1989 | Tan | 62/244 X |

Primary Examiner—Lloyd L. King
Attorney, Agent, or Firm—Browdy and Neimark

[57] ABSTRACT

An automatic coolant sprayer for the car interior comprises a container connected to the trunk compartment's top plate behind car's rear seat, a jet can loaded with speedy coolant, a starting gear to force jet can's valve into action, an PC board integrated with control circuit, a microswitch and a remote controller. Installed on the car's trunk compartment top plate, the inventive sprayer, by opening car door action that touches microswitch or receiving signal from remote controller, can conduct open the control circuit and start the motor of starting gear to operate, whereby a driving arm would be brought along to press the valve of jet can, thus spraying out the coolant toward the car's front and rear seats upper sides. In this way, the temperature of the interior of the car while parked outdoors in a hot summer day will be reduced speedily, to facilitate driver's next car use.

5 Claims, 4 Drawing Sheets

AUTOMATIC COOLANT SPRAYER FOR THE CAR INTERIOR

FIELD OF THE INVENTION

The present invention is related to an automatic coolant sprayer for the car interior, and particularly to a sprayer which, installed on the trunk compartment's top plate behind the rear seat of the car, can spray the coolant automatically, at the use of a remote controller or the opening of the car door, to lower down the temperature of the interior of the car while parked outdoors on a hot sunny day, to facilitate the driver's immediate next car use.

BACKGROUND OF THE INVENTION

Because of limited indoor parking lots, many cars have to park outdoors or on the streetsides on a hot summer day. In such occasions, there arises a speedily climbing temperature in the interior of the car, sometimes up to 50° or over minutes or hours later, though sunbeams-shielding papers are already attached to the car windows. To enter and drive the next time, the driver may have to open wide the car doors, turn on the air conditioning unit and wait for quite a long time before the temperature therein is reduced to a bearable degree. However, even on the next driving trip, the driver may be bearing with the still quite heated seat and be steamed sweaty as a result. Some people apply an air extracting method in an attempt to equalize the car interior temperature with the exterior but with little effect shown. Now in recent years, there has been the use of a coolant sprayer with which to lower down temperature speedily. But since the user has to bend his, or her, body to enter the car and handhold it therein to spray, he, or she, may have already been quite sweaty before starting the next drive. To users, the coolant sprayer indeed has room for improvement.

OBJECTS OF THE INVENTION

The main object of the present invention is to solve the above said problem by providing an automatic coolant sprayer for the car interior. It is installed on the trunk compartment's top plate behind the rear seat of the car, and can be controlled by a remote controller to spray out coolant toward the car interior to reduce the high temperature therein.

Another object is that the sprayer's action switch, if pushed before the driver leaves his car, can automatically spray out coolant toward the car interior when the car door is opened next time for car reuse.

SUMMARY OF THE INVENTION

An automatic coolant sprayer comprises a container which includes all related assemblies, a jet can loaded with the speedy coolant, a starting gear to press the valve of the jet can to spray out the coolant, a PC board and a remote controller or microswitch. Installed on the car's trunk compartment top plate, this sprayer will automatically spray the coolant toward the car interior when ordered by the remote controller or by the opening of the car door, to lower the high temperature of the interior of the car if parked outdoors on a hot sunny day, to facilitate the immediate next drive.

BRIEF DESCRIPTION OF THE DRAWINGS

FIG. 1 is an enlarged perspective view of the invention in FIG. 2;

SPECIFIC DESCRIPTION

Figure 1:
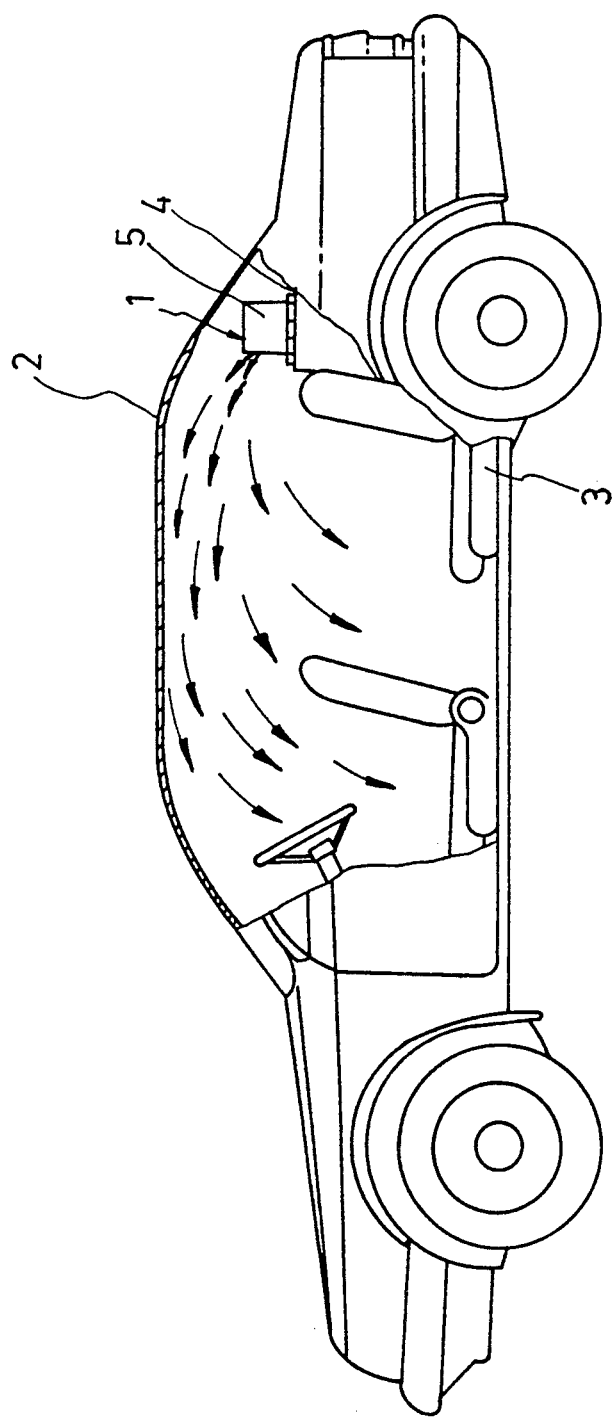
FIG. 1 shows the inventive sprayer installed on the trunk compartment's top plate behind a car's rear seat and in a in-use state.
Figure 2:
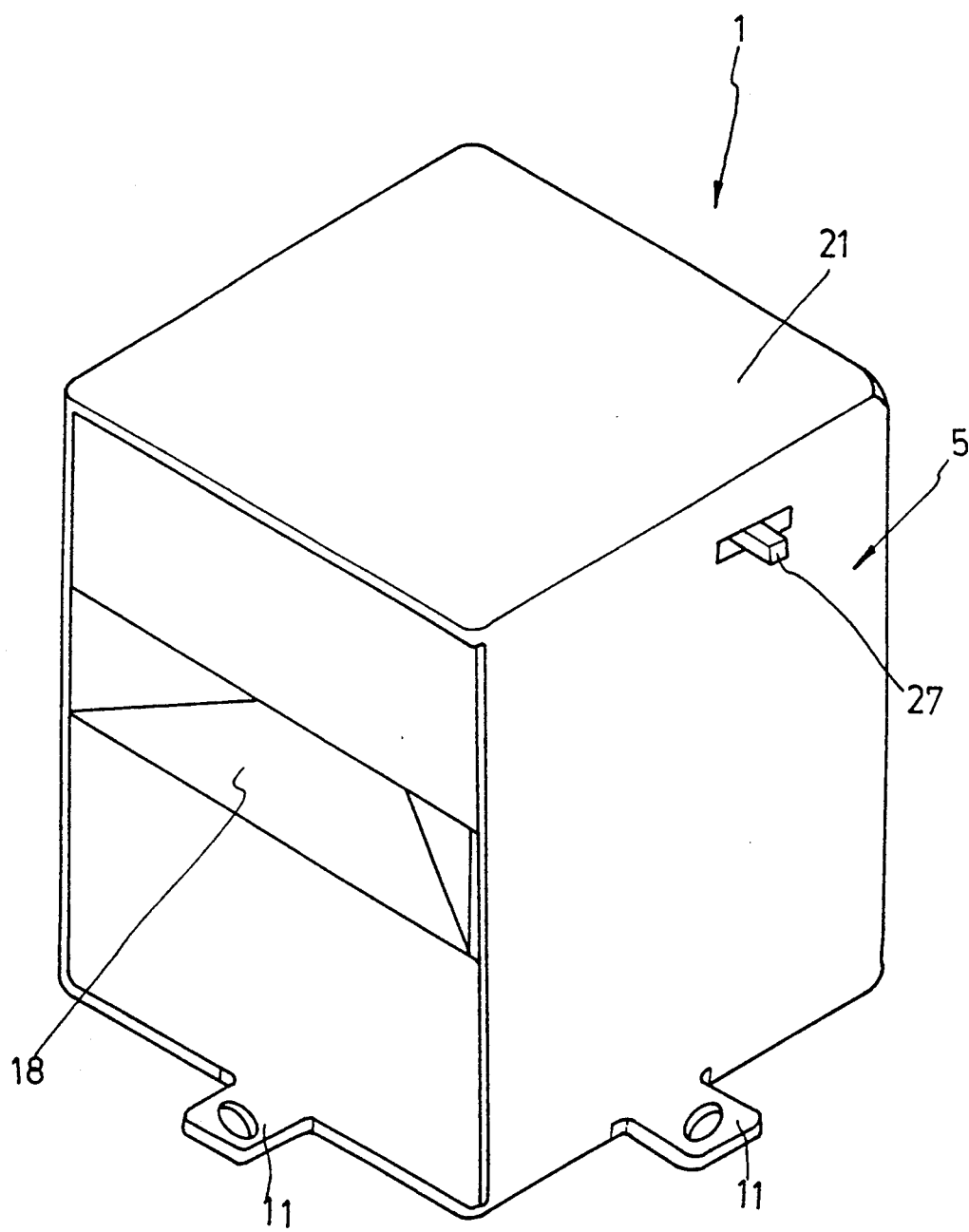
Figure 3:
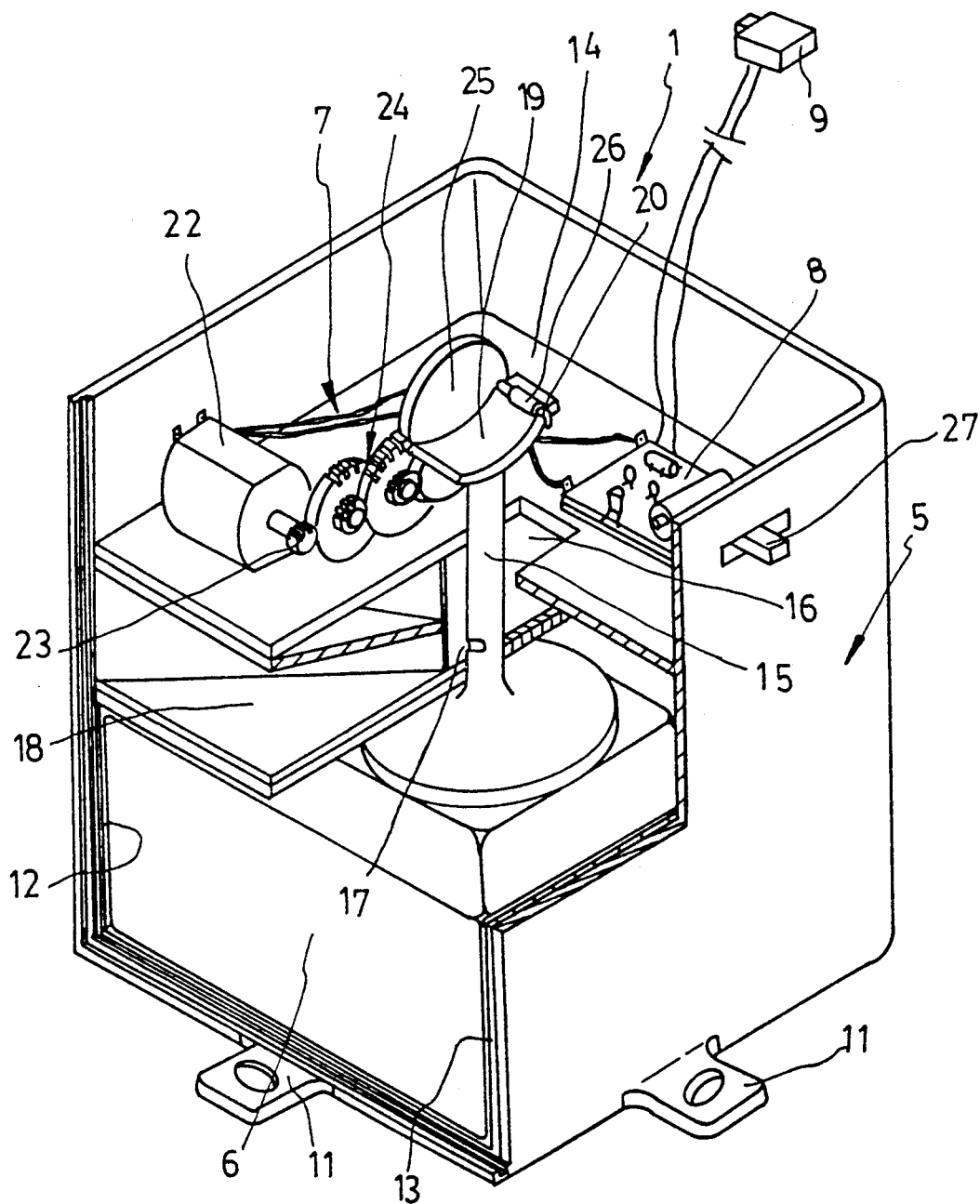
FIG. 3 shows the internal structure of the invention in FIG. 2 but with the container thereof partly cut away.

As FIG. 1 shows, this automatic coolant sprayer 1 is installed on the trunk compartment's top plate 4 behind the rear seat 3 of the car 2, and comprises container 5, jet can 6, starting gear 7, PC board 8, microswitch 9 and remote controller 10 (as FIGS. 2, 3 show). Container 5, of a square or any other suitable shape, is arranged with some set ears 11 along the bottom edge to enable installation on the trunk compartment's top plate 4, and has a containing chamber 12 in its low part thereof in which jet can 6 is accommodated, and to lessen the influence from the external temperature change to jet can 6, the inner side bottom, peripherial and top walls thereof are all attached with a heat-insulating layer 13. As is seen, there is a flute 16 passing the top of containing chamber 12 and the bottom of starting chamber 14, to allow extended valve 15 of jet can 6 to take position when the jet can 6 is accommodated in the container. At that time, orifice 17 of valve 15 should directly face against the pointed portion of flat, cone-shaped jet gate 18, and arc driven plate 19 in contact with the driving arm 20 linked to starting gear 7 in starting chamber 14. Atop containing chamber 12 in the front side of container 5, the flat, cone-shaped jet gate 18 is slanted appropriately upward to some degree. Above jet gate 18, or the container upper part, positions the starting chamber 14 where starting gear 7 and PC board 8 integrated with the control circuit are included and covered by top lid 21.

Figure 4:
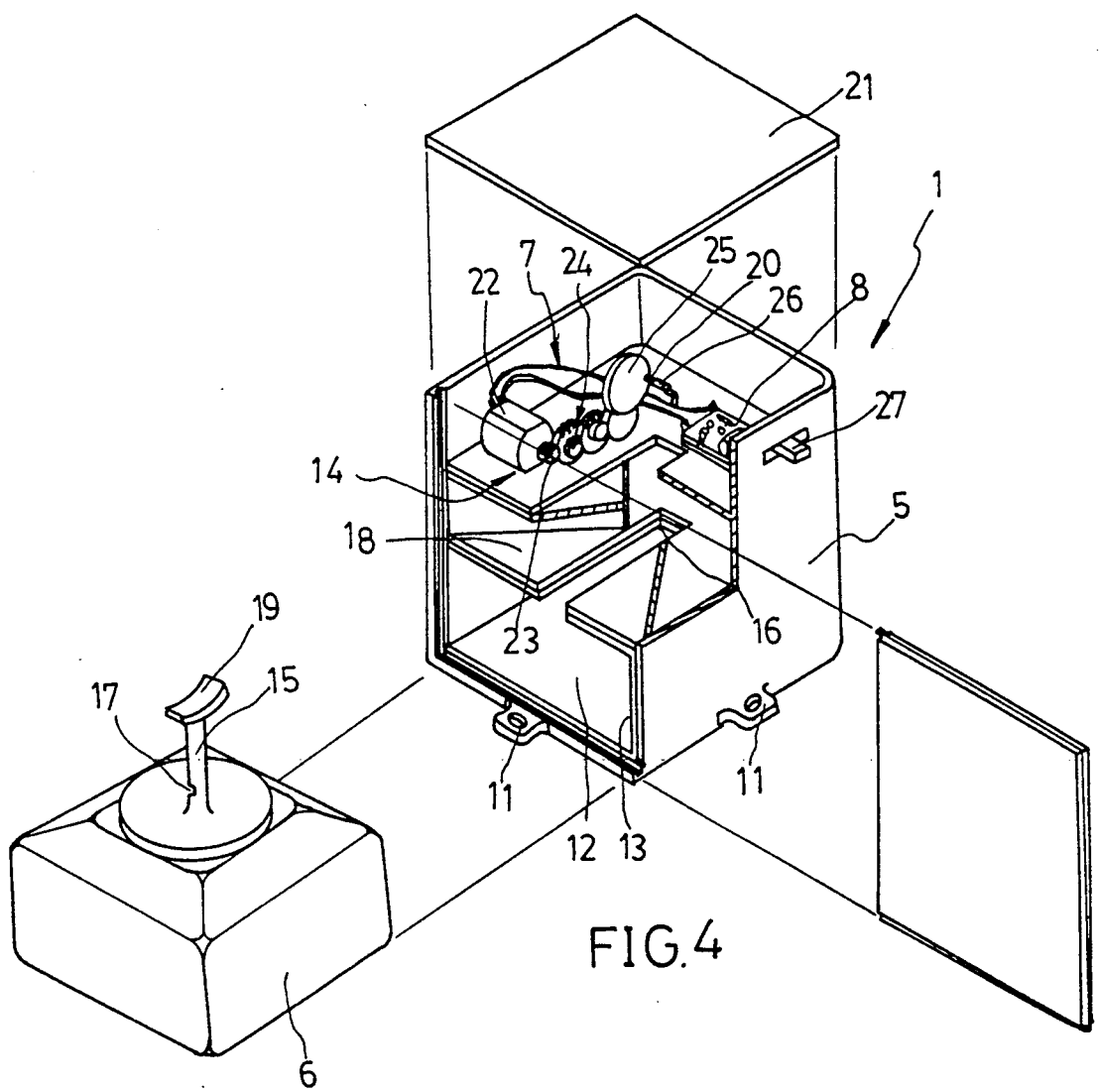
FIG. 4 is a locationally exploded view for the structure of the invention in FIG. 2.
Figure 5:
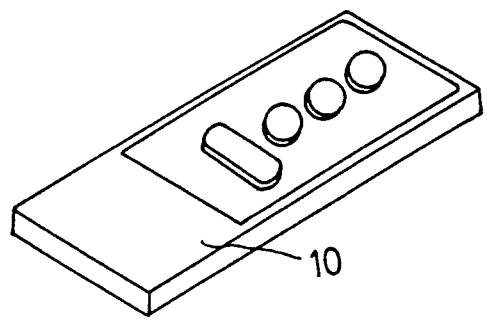
FIG. 5 is a perspective view of the invention's remote controller.

As FIGS. 3, 4 show, jet can 6, of a square or any other suitable shape, is loaded with a mixture of coolant liquid and jet-actuating air (not shown) and which has an appropriately up-slant, flat orifice 17 on valve 15 extended from its upper side thereof. Orifice 17 is put in direct face against the pointed portion of flat, cone-shaped jet gate 18 while jet can 6 is accommodated in the containing chamber 12 of container 5. And arc driven plate 19, connected to the valve top end, is put for contacting with the driving arm 20 of starting gear 7 in starting chamber 14, to press valve 15 into its spraying action.

As FIG. 3 shows, starting gear 7, arranged on the starting chamber bottom floor, has a motor 22 whose output shaft is connected with a main gear 23 so as to start a reducing gear set 24 from which the reducing speed is delivered. As motor 22 is started and the reducing speed delivered, the follower 25 to which driving arm 20 is connected will be brought into turning operation therefore. Then as driving arm 20 gets in contact and presses down driven plate 19, valve 15 is thus actuated and soon sprays out of orifice 17 the coolant in jet can 6. Driving arm 20 is a small circular bar with one end perpendicularly connected to the rim of follower 25 and is sleeved with a small roller 26 which can decrease friction force to cause its rolling contact against driven plate 19. The starting of motor 22 is controlled by the IC time control circuit of PC board 8, shifter 27 and microswitch 9 fixed behind the knob of the car door, or in the alternative by the signal sent from the remote controller 10 to touch the control circuit of PC board 8. Wherein, the IC time control circuit can automatically turn to be open circuit once a predetermined time for operation of motor 22 is set, and make constant the time for driving arm 20 pressing against valve 15. Shifter 27 commands conduction to be made between the microswitch 9 and the IC time control circuit, so it is put at the 'OFF' position in ordinary time so that opening the car door will cause no action from the IC time control circuit. Before the car is parked outdoors on a hot summer day, shifter 27 then should be pushed to the 'ON' position, so that an opening door action will cause microswitch 9 to act and conduct open the IC time control circuit, then after a few seconds delay by a delay circuit, the coolant spraying would automatically begin and work till a predetermined time is met. In the alternative, the IC time control circuit could also be activated by a receiving signal sent from remote controller 10. In this way, the driver can start operation of motor 22 within the distance of the remote controller's action range.

I claim:

1. An automatic coolant sprayer for use in a car interior of a car having a trunk compartment, comprising:
   (a) a container having, at a bottom edge thereof, ears for enabling installation, a containing chamber for accommodating a jet can, and in an upper part thereof, a cone-shaped, appropriately up-slant degreed jet gate and a starting chamber;
   (b) a jet can having a top mounted valve connected to an arc-driven plate, said jet can being loaded with a mixture of coolant liquid and jet-actuating air;
   (c) a starting gear arranged on a starting chamber bottom floor of said container end having a motor with an output shaft connected with a main gear allowing start-up of a reducing gear set to deliver a reducing speed turning a follower having a connected driving arm to force said valve's driven plate to be pressed down, thereby spraying said coolant out of an orifice;
   (d) a PC board, having an IC time control circuit having a power source, a delay circuit and a shifter and having connection via a power lead to a microswitch fixed behind the knob of a car door; the shifter commanding conduction between the circuit and micro-switch; the micro-switch leading conduction to the power source of the circuit, which via a delay circuit will start motor operation; the IC time control circuit controlling stoppage of the motor operation;
   (e) a heat insulating layer provided on bottom, peripheral and top walls of said containing chamber; wherein said sprayer is installed on a top plate of said trunk compartment behind a rear seat and wherein said sprayer is able to spray out the coolant automatically.

2. The automatic coolant sprayer of claim 1 wherein said container is of a square shape.

3. The automatic coolant sprayer of claim 1 wherein said jet can is of a square shape.

4. The automatic coolant sprayer of claim 1 wherein said sprayer is activated to automatically spray out the coolant by opening a car door.

5. The automatic coolant sprayer of claim 1 wherein said sprayer is activated to automatically spray out the coolant by use of a remote controller.

* * * * *